Jan. 27, 1953
J. GALERA
2,626,810
ROTARY AND RECIPROCATING MULTIPLE VALVE
Filed Jan. 8, 1947
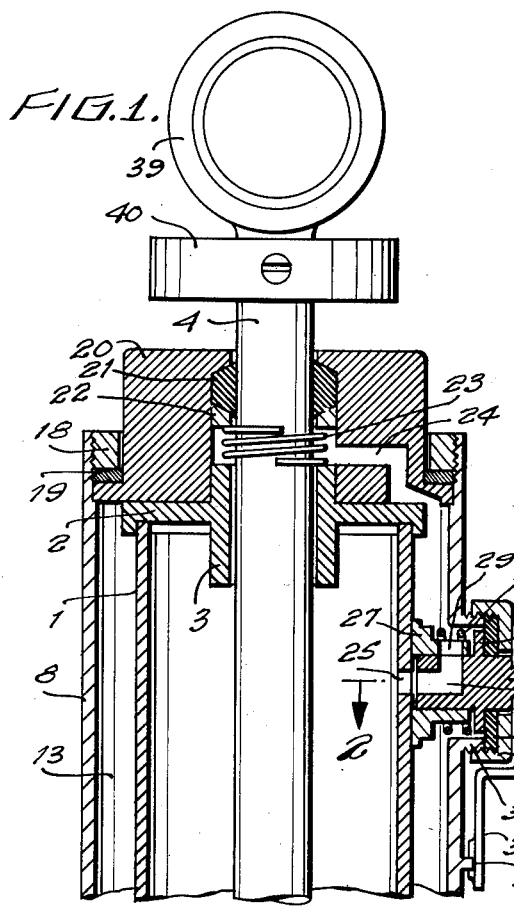
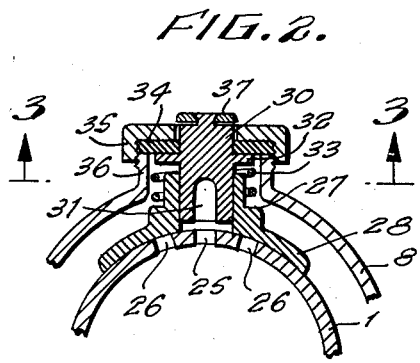
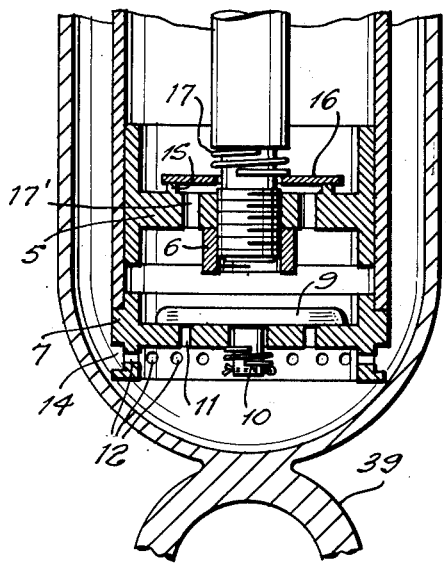
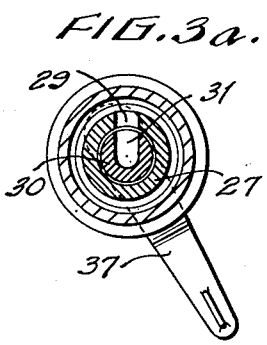
INVENTOR.
Jose Galera
BY Patented Jan. 27, 1953

2,626,810

UNITED STATES PATENT OFFICE 2,626,810

ROTARY AND RECIPROCATING MULTIPLE VALVE

José Galera, Rosario, Argentina

Application January 8, 1947, Serial No. 720,844
In Argentina December 22, 1945

3 Claims. (Cl. 277—55)

This invention relates to a novel tubular hydraulically controlled shock absorber, for use in motor cars or machines, and an essential feature of the same consists in the provision in said device of means for adjusting the resistance to the shock absorbing action, the control of which may be performed from outside of the enclosing casing, and such adjustment may be carried out even when the shock absorber is in its operative position.

The tubular hydraulic shock absorbers are in general of a more simple construction than those of the rotatory type, and their behaviour is also of a more convenient nature, owing to the simplicity of their adjustment, limited, at its most complex part, to the operation of a plunger within a cylinder. The apparatus of this type also allow of an unexpensive reconditioning which may not be effected in the shock absorbers of the rotatory type.

Notwithstanding the advantages above set forth, in these latter times increased use is being made of the rotatory shock absorber and the reason of such preference is to be found in connection with the adjustment of the shock absorbing action. In fact, while in the rotatory shock absorbers the problem of said adjustment has been solved in several ways by means of devices adapted to be controlled from outside, in the tubular shock absorbers of all types heretofore known said operation necessitates the dismounting of the mechanism in order to gain access to the adjusting devices, which means a considerable loss of time, so much the more when considering that in daily practice the adjustment of the control is effected by guesswork.

Among the particular features of the novel tubular shock absorber is to be noted the fact that the same consists of a pump device, formed by a cylinder and a plunger mounted slidably therein, said pump being housed within a sealed casing, between the outer part of the cylinder and the interior of said casing a chamber being arranged, filled the same as the interior of the cylinder, with the fluid which acts as shock absorber. The inlet and outlet ducts of the cylinder for said fluid are in direct communication with the chamber arranged between said cylinder and the external casing. Under these conditions, the movement of the plunger will force the fluid, displacing the same along a closed circuit within said casing.

A further particular feature of this invention consists in the arrangement in one or several communication orifices between the interior of the cylinder a two-way valve, whose body is mounted on the cylinder, while the rotatory member of the same is secured to the casing of the shock absorber, in such a way as to protrude beyond the same. In consequence the resistance opposed to circulation by the fluid may be varied by adjusting said two-way valve from outside.

A further improvement introduced into the shock absorbers of this kind consists in providing a safety valve between the interior of the cylinder and the enclosing casing or chamber, in order to avoid excessive pressures liable to cause damage. Said valve may consist of the same body of the aforementioned two-way valve, which for that purpose may consist of a member independent of the cylinder and pressed against the same by any suitable means.

Other details of the invention will be understood from a consideration of the following description of a preferred embodiment of the improved device, illustrated by way of example in the accompanying sheet of drawings, wherein—

Figure 1 shows a longitudinal section of a tubular hydraulic shock absorber, of single action, constructed in accordance with this invention.

Figure 2 is a partial section of the same shock absorber, the view having been taken on the line 2—2.

Figure 3 shows a detail of one of the positions of the adjusting device of the shock absorber, taken along line 3—3 of Fig. 2.

Figure 3a shows a detail similar to that of Figure 3, but with the adjusting element occupying a different position.

The same numbers of reference have been used to indicate similar or corresponding parts in all the different views.

The shock absorber consists of a pump casing or body formed by a hollow cylinder 1, closed at one of its ends by a cap 2, provided at its centre with a hub 3 of considerable length, through the interior of which passes a rod 4 having threaded onto its end a plunger 5, locked in position by means of a lock nut 6 fitting against the inner wall of the cylinder 1. The other end of the cylinder 1 is covered by a member 7 which rests along its entire perimeter on the bottom of the outer casing 8 of the shock absorber.

To the member 7 is secured a valve 9, provided with a spring 10 acting on the orifices 11 as a retention means for the fluid in the direction of exhaust thereof from the interior of the cylinder 1. Said member 7 is also provided with a series of holes 12 which establish a communication between the space confined between the member 7 and the bottom of the casing 8 and the space 13 formed between the outer wall of the cylinder 1 and said casing 8. The holes 12 on the side of the space 13 open into a groove 14 of the member 7, in which is placed a suitable means for the filtration of the fluid (not shown).

The plunger 5 is provided on its face opposite the cap 2 with a circular flange 15 which serves as a seat for a disc 16 pressed against said flange by the action of a spring 17, arranged to rest on an enlarged portion of the rod 4; within the zone confined by said flange 15 a plurality of orifices 17' is provided which extend through said plunger 5 from one side to the other thereof. The conjoint of elements just described constitutes the retention or stop valve of the plunger 5.

The body formed by the cylinder 1 and the parts 2 and 7 is pressed against the bottom of the casing 8 by a washer 18 threaded into the interior of the mouth of the casing 8; the washer 18 is supported with the interposition of a packing 19 on a shoulder of the member 20 which, in turn, is supported on the outer side of the cap 2.

Through the central part of the member 20 extends the rod 4 and at the side facing the cap 2, a cavity is formed between said member 20 and the rod 4, the bottom of said cavity being of conical shape; a packing 21, held in position by a washer 22, also of conical shape at its surface in contact with said packing, bearing on the bottom of said cavity. The washer 22 is submitted to the pressure of a spring 23, resting on the hub 3 of the cap 2 and extending also into the said annular cavity. The conical surfaces of the bottom of the cavity and the washer 22 act in the manner of wedges to compress the packing 21 against the rod 4, thereby assuring a perfectly tight seal. The zone of the cavity occupied by the spring 23 communicates with the space 13 by means of a duct 24 which extends through the member 20.

The cylinder 1 is provided at a certain distance from the cap 2, on a common circumference, with a central orifice 25 and two lateral orifices 26, of a smaller section than the former one. Said orifices are covered by a hood shaped member 27, with a passage situated in front of the orifice 25 and a flange 28 or skirt snugly adapted to the outer surface of the cylinder 1 and obturating the orifices 26. The member 27 is provided with an opening 29 in communication with the space 13 by means of its central duct.

Within the central duct of the member 27 fits a cylindrical body 30, formed with a communication 31 between its base and its cylindrical surface, at which it opens at the level of the opening 29 of the member 27. The body 30 is formed with a circular flange 32 which serves as a seat for a spring 33, abutting with its other end against the base of the member 27, so as to tend to separate said parts one from another. On the other side of said flange 32 is provided a packing 34 adapted to the bottom of a cover 35 threaded onto the hood shaped member or mouth piece 36, provided for that purpose on the casing 8.

The body 30 extends through the cover 35 and to its outer side is secured a shank 37, the end of which presses on a guide member 38, formed with notches, in order to hold the shank in position after the same having being conveniently adjusted.

The casing 8 is provided on its outer end with an eye 39 which together with a similar eye provided on the rod 4, on its outer end, serve for fixing the shock absorber in its operative position. The rod 4 is further provided with a disc 40 which together with the outstanding part of the member 20 may be used for securing thereto a flexible or resilient sleeve of rubber or hose, etc., which allows of the free displacement of the rod 4 and keeps the same out of contact with dirt or foreign matter, liable to cause undue wear of said parts.

The operation of the shock absorber is quite simple; when approaching the eyes 39 one to another, the resistance to be overcome is very slight, being mainly that offered to the passage of the fluid from one side of the plunger 5 to the other thereof, through the orifices 17', against the action of the spring 17. Some fluid may also be displaced through the orifice 25, and also offers resistance to the movement of the plunger 5. In the meantime, the valve 9 will prevent the fluid from escaping by the orifices 11 by the action of the plunger 5. Now, when separating said eyes 39 one from another, the disc 16 will bear against the flange 15 and the passage of the fluid through the plunger 5 will be stopped. The fluid confined between said plunger 5 and the cap 2 will be compressed, its only means for escape being the passage opened by the hole 25, communication 31 and opening 29 to the space 13, and from this latter, by the orifices 12 and 11, against the action of the spring 10, to the space comprised between the plunger 5 and the member 7. The resistance opposed to said circulation and, in consequence, the shock absorbing effect, depends on the relative position of the members 30 and 27, as by these the section of registration between the communication 31 and the opening 29 will be varied. It will be seen that in the position shown in Figure 3a, the registration is complete and the resistance offered to the passage of the fluid will be reduced to a minimum, while in the position shown in Figure 3, said registration is only partial, so that a greater degree of shock absorbing action will be provided.

If in consequence of a sudden impact, the pressure in the zone between the plunger and the cap 2 rises above a certain limit, this pressure, by acting through the orifices 26 of the cylinder 1 against the base or flange 28 of the member 27, will raise this latter against the action of the spring 33, so that a direct communication will be established between the interior of the cylinder 1 and the space 13 through the openings 25 and 26 and the space comprised between the member 27 and the cylinder 1. This passage will remain open until the pressure within the interior of the cylinder will have descended below the predetermined limit.

The openings 25 and 26 will be covered by the plunger 5 before its contact with the cap 2, whereby a strong braking effect will be applied to said plunger 5 and prevent the same from impacting against the cap 2. Owing to this condition, a considerable excess of pressure will be caused and the fluid will escape by slight amounts by the rims of the plunger 5, flowing along the wall of the cylinder 1, as well as between the rod 4 and the tube 3, until reaching the zone in which is arranged the spring 23, whence it will be discharged into the space or chamber 13 by the duct 24.

From the foregoing it will be seen that in the shock absorber according to this invention, the fluid is caused to flow in one single direction, along a closed circuit.

It should be understood that the foregoing description as well as the illustrative drawing are only furnished by way of demonstrative but not restrictive example, and that many modifications of construction, shape and detail may be introduced without departing from the scope of the invention, as clearly defined in the following claims.

Having now particularly described and ascertained the nature of my said invention and in what manner the same is to be performed, I declare that what I claim and desire to secure by Letters Patent, is:

1. In a device having a pair of spaced walls forming independent spaces, in combination with valve means arranged to control communication from a first space to a second space wherein one of said walls includes a central opening and at least one lateral opening; a flange member covering said lateral opening in said wall and having a cylindrical bore disposed over said central opening, and a passage connecting said cylindrical bore with said second space; a body having a cylindrical portion turnably mounted within said cylindrical bore and a duct adapted to connect said central opening with said passage, said cylindrical portion being adapted to gradually close said passage when being turned, and further adapted to allow axial sliding of said flange member away from said wall; a spring with one end abutting on said body and with the other end on said flange member urging said flange member against said wall so as to close said lateral opening, said body extending through the second wall into a third space; means cooperating with the second wall and securing said body against axial displacement; and operating means located in the third space for turning said body.

2. In a device having a pair of spaced walls forming independent spaces, in combination with valve means arranged to control communication from a first space to a second space wherein one of said walls includes a central opening and two lateral openings; a flange member covering said lateral openings in said wall and having a cylindrical bore disposed over said central opening, and a passage connecting said cylindrical bore with said second space; a body having a cylindrical portion turnably mounted within said cylindrical bore and a duct adapted to connect said central opening with said passage, said cylindrical portion being adapted to gradually close said passage when being turned, and further adapted to allow axial sliding of said flange member away from said wall; a spring with one end abutting on a flange portion of said body and with the other end on said flange member urging said flange member against said wall so as to close said lateral openings, said body extending through the second wall into a third space; means cooperating with the second wall and securing said body against axial displacement; manually operated means located in the third space for turning said body; and means for securing said manually operated means in various operating positions.

3. In a device having a pair of spaced walls forming independent spaces, in combination with valve means arranged to control communication from a first space to a second space wherein one of said walls includes a central opening and two lateral openings; a flange member covering said lateral openings in said wall and having a cylindrical bore disposed over said central opening, and a passage connecting said cylindrical bore with said second space; a body having a cylindrical portion turnably mounted within said cylindrical bore and a duct adapted to connect said central opening with said passage, said cylindrical portion being adapted to gradually close said passage when being turned, and further adapted to allow axial sliding of said flange member away from said wall; a spring with one end abutting on a flange portion of said body and with the other end on said flange member urging said flange member against said wall so as to close said lateral openings, said body extending through the second wall into a third space; means cooperating with the second wall and securing said body against axial displacement; manually operated means located in the third space for turning said body; means for securing said manually operated means in various operating positions; and sealing means about one end of said body sealing said second space from said third space.

JOSÉ GALERA.

REFERENCES CITED

The following references are of record in the file of this patent:

UNITED STATES PATENTS

| Number | Name | Date |
| --- | --- | --- |
| 865,451 | Swift | Sept. 10, 1907 |
| 1,307,502 | Knudson | June 24, 1919 |
| 1,373,315 | Dunn | Mar. 29, 1921 |
| 1,723,445 | Schmitt | Aug. 6, 1929 |
| 2,163,254 | Binder | June 20, 1939 |
| 2,464,482 | Birkemeier | Mar. 15, 1949 |

FOREIGN PATENTS

| Number | Country | Date |
| --- | --- | --- |
| 154,924 | Austria | Nov. 10, 1938 |